June 4, 1929.  H. MOBBS  1,715,940
TOP FOR MOTOR VEHICLES
Filed Sept. 8, 1926  2 Sheets-Sheet 1
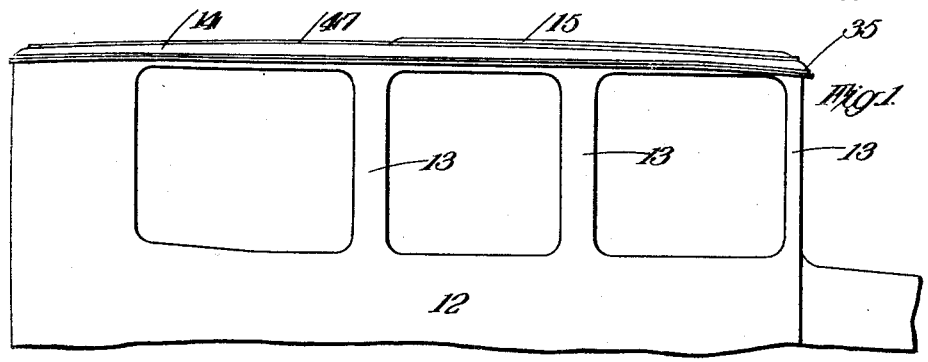
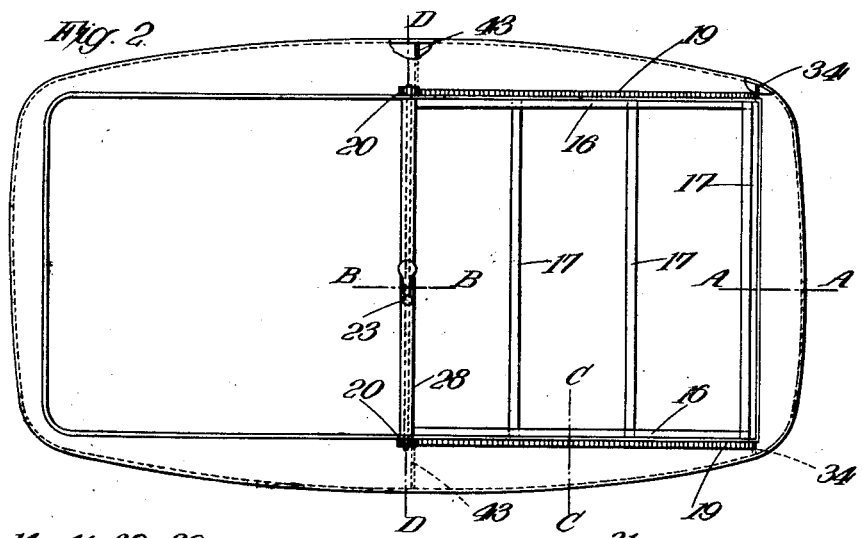
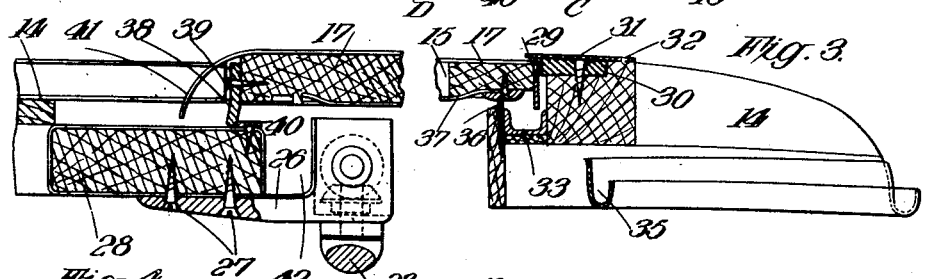
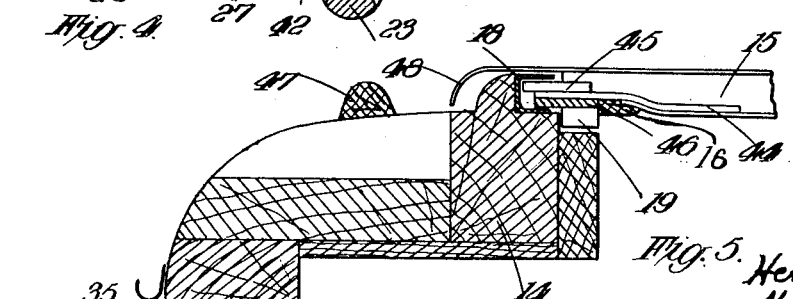
Inventor,
Herbert Mobbs
M. H. Lockwood
Attorney.

June 4, 1929. H. MOBBS 1,715,940.
TOP FOR MOTOR VEHICLES
Filed Sept. 8, 1926 2 Sheets-Sheet 2
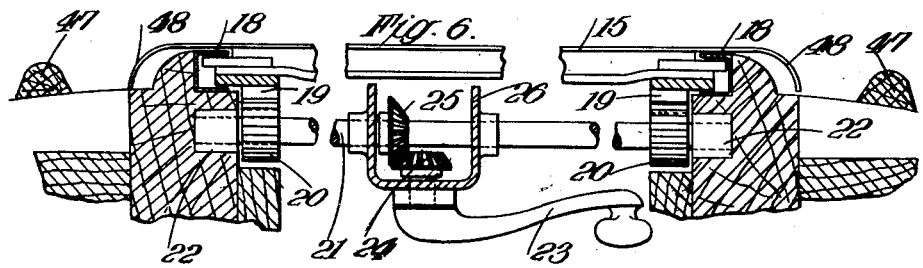
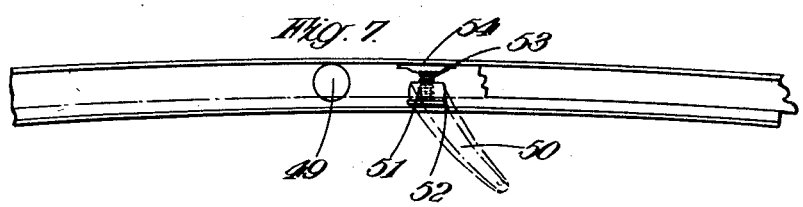
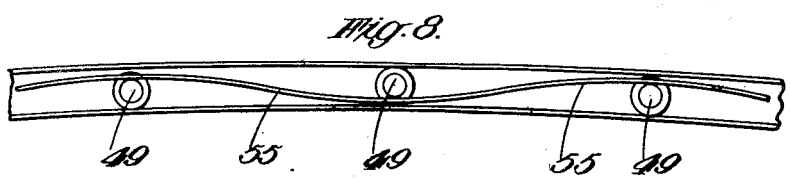
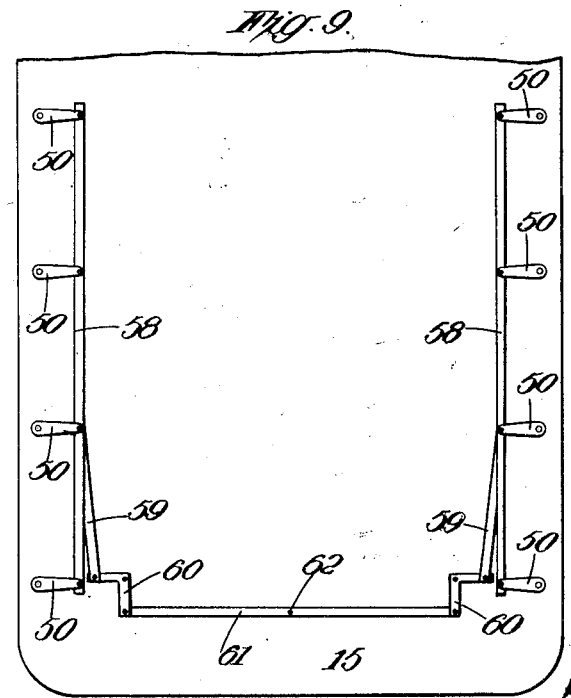
Inventor,
Herbert Mobbs
M. H. Lockwood
Attorney.

Patented June 4, 1929.

1,715,940

UNITED STATES PATENT OFFICE.

HERBERT MOBBS, OF NORTHAMPTON, ENGLAND.

TOP FOR MOTOR VEHICLES.

Application filed September 8, 1926, Serial No. 134,184, and in Great Britain September 14, 1925.

This invention relates to bodies for use on motor cars and the like, and particularly to improvements in the roofs of such vehicles.

The object of the present invention is to provide a body with a roof, a portion of which is adapted to be moved in such manner as to enhance the general comfort of the occupants, by opening up the roof to an adjustable extent.

A further object is to provide a water and weather tight construction so designed as to obviate the unpleasant drumming and rattling effects which are so liable to develop after a brief period of use in body work, and also to provide means whereby the functioning parts may be operated readily and conveniently without the necessity of using expensive or complicated mechanism or of stopping or getting out of the vehicle.

A constructional form of the invention will now be described with reference to the accompanying drawings, wherein Figure 1 is a partial side elevation of a motor car body of the saloon type, provided, in a position extending over that portion occupied by the front seating accommodation, with a sliding roof constructed in accordance with this invention; Figure 2 is a plan view from the underside of the roof, the upholstery being removed; Figures 3, 4 and 5 are enlarged views illustrating details of the means employed for obtaining water and weather tight joints between the fixed and sliding portions of the roof, Figure 3 being a section on line A—A Figure 2; Figure 4 a section on line B—B, Figure 2; Figure 5 a section on line C—C, Figure 2, whilst Figure 6 is a sectional view showing a means for operating the sliding portion of the roof, such section being taken on line D—D, Figure 2.

Figures 7 and 8 illustrate different means which may be employed for retaining the sliding roof within its guides, and are drawn to a still larger scale than that of Figures 3 to 6.

Figure 9 is a plan view showing mechanism for operating concurrently a number of devices for retaining the sliding roof in any desired position.

Referring to Figures 1 and 2, the body of the saloon type consists of a body portion 12, fitted with the usual pillars or uprights 13, carrying a fixed roof 14, of usual construction extending approximately over the rear half of the vehicle. 15 is a panel forming the sliding portion of the roof which is shown in Figures 1 and 2 as in the fully closed position.

The closed upper portion of the roof 14, extending over the rear half of the top, is formed with a depressed portion, below the peripheral edge thereof, (Figure 4), to form a well into which the sliding roof panel 15 is adapted to slide when the front half of the roof is opened.

As shown in Figures 3 to 6, the sliding roof panel 15 consists of longitudinal members 16 and transverse members 17 built up to form a substantially rectangular structure, the longitudinal members 16 being capable of bending so as to conform with the curvature of guides 18, within which they are adapted to slide. The guides 18, secured in any convenient manner (not shown) along the sides of the well formed by the depression of the rear portion of the roof and along the sides of the opening covered by the sliding roof panel 15, thereby forming part of the fixed portion of the roof 14 (see particularly Figure 5). It will be observed that the curvature of the roof in a longitudinal direction rises from each end of the roof to a highest point intermediate of its length hence necessitating the employment of arc shaped guides, the degree of curvature of which is not necessarily constant throughout their length. The transverse members 17 are not necessarily flexible throughout their length as in the construction illustrated the transversal curvature of the roof is substantially the same at various points along the major axis of the roof. The sliding portion 15 is provided on its underside and along each of its two longitudinal edges with a toothed rack 19, adapted to engage with a corresponding pinion 20, both pinions being mounted on a single spindle 21 extending transversely of the vehicle, and rotatably mounted in bearings 22, fitted in any convenient manner to the fixed portion of the roof, as shown particularly in Figure 6. The means employed for rotating the spindle 21, comprise a hand lever 23 attached to a bevel wheel 24 engaging with a corresponding bevel wheel 25, secured to the spindle 21, said lever 23 being mounted rotatably on a bracket 26 secured as shown in Figure 4, by screws 27 to a fixed cross member 28, forming part of the fixed portion 14 of the roof. Rotation of the handle 23, by causing the rotation of the pinions 20, will bring about longitudinal movement of the sliding portion 15 of the roof, resulting in opening up the roof as a whole to an extent corresponding with the travel of such sliding portion 15 relatively to the fixed portion 14. In the construction shown, the roof 15 is adapted to slide back over the fixed portion 14 and thus leave uncovered that portion over the front half of the vehicle body.

Figure 3 illustrates a method of obtaining an air- and water-tight joint along that transversal edge of the sliding roof which extends over the windscreen. The front cross member 17 of the sliding portion 15 of the roof is provided with a metal or resilient strip 29 adapted to engage a buffer piece 30 secured to the fixed portion of the body by screws 31, passing through a cover strip 32 extending to a small extent over the joint between such moveable and fixed portions when the roof is in the closed condition. 33 is a water trap consisting of a metal channel intended to collect any water which might pass in through the joint just described, and provided at each end with channels 34/34 (see Figure 2) leading to a rain channel 35 secured in the usual manner to the lateral edges of the fixed portion 14 of the roof. 36 is a fillet, preferably of resilient material, secured in any convenient manner to the fixed roof, and adapted to rub against a fillet 37 secured to the underside of the front cross member 17 and affording a substantially air-tight joint.

Figure 4 illustrates a method of obtaining a weather-tight joint along the rear transversal edge of the sliding roof, the rear transversal member 17 of which is fitted with a strip 38 of resilient material secured by means of screws 39 to the sliding portion of the roof, and adapted when the sliding portion 15 of the roof is in the closed position to come up against a fillet 40 secured to the fixed cross member 28. 41 is a curved shield for preventing driving rain from beating on to such joint, and 42 is a water trap formed along the front edge of the cross member 28 and communicating by means of channels 43 (see Figure 2) with the rain channel 35 above mentioned, in the same manner as the water trap 33.

Figure 5 illustrates a method of making the longitudinal joint between the fixed and sliding portions of the roof. The transverse members 17 of the sliding roof 15 are provided with outwardly extending bearers 44, to the upper faces of which are secured bearer blocks 45 adapted to engage the under-surface of the upper flanges of the channels or guides 18, and to the under faces of which are secured strips 46, carrying or formed integral with the racks 19 and engaging the upper surface of the lower flanges of the channels or guides 18. 47 are wood fillets extending longitudinally along the roof and serving to prevent driving rain from passing between the joint formed between the fixed portion 14 of the roof and the curved shield 48 secured to the sliding portion 15 of the roof.

Figure 7 is an elevation showing means for locking the sliding roof in any desired position and preventing any rattle or drumming of same. In this construction the bearers 44 (Figure 5) carry rollers 49 of a diameter slightly less than the distance between the flanges of the guides 18. 50 is an arm secured to or forming part of a nut 51 rotatably mounted on a base plate 52, carried by the sliding portion 15 of the roof and engaging with a screw 53 carrying a shoe 54, and adapted when the handle 50 is rotated to force such shoe up against the top flange of the channel 18 and to secure the parts in position. If necessary a plurality of such devices may be used. These locking means may be operated individually by hand or be connected together by means of rods in such manner as to obtain concurrent operation from a single operating handle as shown and described later with reference to Figure 9.

Figure 8 illustrates a method of preventing chattering of the sliding portion of the roof, in which construction the rollers 49 above referred to are held in engagement with the flanges of the guides 18, by means of a metal strip 55 of resilient and flexible material placed under and over successive rollers, in such manner as to hold them in close engagement with the upper and lower flanges of the guide 18, such strip being secured in any convenient manner to the fixed portion of the roof by means not shown.

Figure 9 illustrates diagrammatically a construction in which a number of operating arms 50, mounted on the sliding portion 15 of the roof and on each side thereof, are attached to longitudinally extending connecting rods 58—58. Each connecting rod is pivotally secured by a link 59 to one arm of a corresponding bell crank lever 60 pivotally mounted on the roof in any convenient manner. The free ends of the bell crank levers are connected by a link 61 fitted with an operating handle or grip 62 extending within the body of the vehicle whereby such link may be slid transversely of the body so as to impart concurrent movement to all the operating arms 50 on both sides of the vehicle and thus obtain the tightening of all the retaining means by a single operation of such handle or grip.

The invention as above described is designed and illustrated more particularly in connection with a roof of "solid" construction, i. e., in which the fixed portion of the roof is built as a permanent structure, the top covering being either of "stiff" material of a suitable character or covered with "soft" material, such as leather or leather substitute, but the invention is equally applicable to bodies in which the roof is built in a similar manner to all-weather hoods on touring or open cars and covered with "soft" material supported by suitable light framework.

In a still more simplified construction the operating handle and spindle pinions and racks may be dispensed with and replaced by an ordinary push and pull handle, fitted either within the body or outside same, in which case the sliding portion of the roof would slide lightly or friction-tight within the guides 18 and be held in position in any convenient manner.

If desired the moveable portion of the roof may be carried on small rollers adapted to travel in the guides 18 in which case the locking means previously described may be arranged in such manner that the operation of such locking means will have for effect slightly to raise such rollers off the guides when the co-acting parts are in locked condition.

I claim:—

1. A top for vehicles comprising a fixed roof having the front thereof forming an opening, guide members on each side of said opening and extending from front to rear of said roof, said guide members forming a recess in the rear portion of said roof, a movable panel for covering said opening, outwardly extending bearer elements attached to said movable panel, roller members carried by said bearer elements and movable in said guide members, and resilient means extending substantially the length of said guide members and cooperating with said rollers, said resilient means being free-floating at the ends, and guide members for resisting any movement of said movable panel.

2. A top for vehicles comprising a fixed roof, having the front thereof forming an opening, guide members on each side of said opening and extending longitudinally of said roof, a movable panel adapted to cover said opening, roller members carried on the under side of said movable panel and disposed within said guide members, pressure elements engaging with said guide members, said pressure elements being laced alternately over and under said roller members.

HERBERT MOBBS.